(12) United States Patent
Bobenhausen

(10) Patent No.: US 7,506,478 B2
(45) Date of Patent: Mar. 24, 2009

(54) METHOD AND APPARATUS FOR DETECTING SMOKE AND SMOTHERING A FIRE

(75) Inventor: Axel Bobenhausen, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 753 days.

(21) Appl. No.: 10/831,444

(22) Filed: Apr. 22, 2004

(65) Prior Publication Data

US 2004/0211150 A1 Oct. 28, 2004

(30) Foreign Application Priority Data

Apr. 26, 2003 (DE) ................. 103 18 975

(51) Int. Cl.
E06B 7/28 (2006.01)
(52) U.S. Cl. ..................... 52/232; 244/118.1
(58) Field of Classification Search ........... 52/232; 244/118.1
See application file for complete search history.

(56) References Cited

U.S. PATENT DOCUMENTS

| 3,583,658 | A | | 6/1971 | Herweg |
| 4,307,543 | A | * | 12/1981 | Schulthess .............. 52/232 |
| 5,398,467 | A | * | 3/1995 | Ricq et al. ............... 52/232 |
| 5,687,929 | A | * | 11/1997 | Hart et al. ............. 244/118.1 |
| 5,924,589 | A | | 7/1999 | Gordon |
| 6,115,976 | A | * | 9/2000 | Gomez .................. 52/232 |
| 6,572,948 | B1 | | 6/2003 | Dykhoff |
| 6,752,714 | B1 | | 6/2004 | Mann |
| 7,331,401 | B2 | * | 2/2008 | Bobenhausen ........... 244/129.2 |
| 2001/0046456 | A1 | | 11/2001 | Langer et al. |
| 2004/0000410 | A1 | | 1/2004 | Burns |
| 2004/0157012 | A1 | | 8/2004 | Miller et al. |
| 2004/0213320 | A1 | | 10/2004 | Bobenhausen |
| 2004/0216900 | A1 | | 11/2004 | Bobenhausen |

FOREIGN PATENT DOCUMENTS

| DE | 3612377 | 10/1987 |
| DE | 297 12 909 | 11/1997 |
| EP | 1 283 065 | 2/2003 |
| GB | 2107182 | 4/1983 |
| GB | 2107183 | 4/1983 |
| GB | 2 159 051 | 11/1985 |
| GB | 2277871 | 11/1994 |
| GB | 2 312 842 | 11/1997 |
| GB | 2 376 706 | 12/2002 |
| WO | WO 2005/036578 | 4/2005 |

* cited by examiner

Primary Examiner—Richard E Chilcot, Jr.
Assistant Examiner—Matthew J Smith
(74) Attorney, Agent, or Firm—W. F. Fasse; W. G. Fasse

(57) ABSTRACT

A fire in an enclosed space in an aircraft is, for example, visually detected early since smoke generated by a beginning fire is initially permitted to escape from the enclosed space. The enclosed space is, for example, an overhead luggage bin or a goods container holding food or freight. The smoke can pass through a flow passage either in the form of a gap or a leak between a lid and walls, or between a door and a door frame, or between walls and other walls joined together. Intumescent material is installed along the gaps or leaks and expands into the gaps or leaks when the fire has generated a temperature sufficient for causing the expansion of the intumescent material. Preferably a guide surface assures that the intumescent material expands into the gaps and leaks and cannot expand away from gaps and leaks.

14 Claims, 1 Drawing Sheet

METHOD AND APPARATUS FOR DETECTING SMOKE AND SMOTHERING A FIRE

CROSS-REFERENCE TO RELATED APPLICATION

This application is related to my copending application Ser. No. 10/831,445 entitled "Method And Apparatus For Fighting A Fire In An Enclosed Space In An Aircraft", filed on Apr. 22, 2004. The entire disclosure of the related application is incorporated herein by reference.

PRIORITY CLAIM

This application is based on and claims the priority under 35 U.S.C. §119 of German Patent Application 103 18 975.0, filed on Apr. 26, 2003, the entire disclosure of which is incorporated herein by reference.

FIELD OF THE INVENTION

The invention relates to a method for visually detecting smoke leaking out of an enclosed space in an aircraft. The invention also relates to an apparatus for smothering the fire that generated the smoke.

BACKGROUND INFORMATION

Enclosed spaces such as overhead luggage compartments in a passenger cabin ceiling or goods containers for food and freight in the loading space of an aircraft, are conventionally not sealed in an airtight manner so that any fires that might start in these enclosed spaces would be automatically smothered. Rather, leaks in the form of air flow passages, gaps and openings admit air and thus oxygen into the enclosed space thereby fueling the fire. That is a disadvantage. However, such leaks have the advantage that an early detection of a fire is possible because smoke generation is most intense at the beginning of a fire and the smoke can escape through these leaks, whereby an early visual detection is possible. The supply of air and thus oxygen applies particularly to overhead luggage compartments or bins and to containers that may be stored in a galley area or in the freight space of an aircraft. Fires that have started in these enclosed spaces have been known to expand with detrimental effects into the passenger cabin or into the freight space of an aircraft.

UK Patent Publication GB 2,107,182 A discloses various types of louvers for covering openings in buildings and in doors of buildings for air ventilation. These louvers are constructed with slats, the back side of which is coated with intumescent material for closing off the air flow channels formed between neighboring slats of the louver when the intumescent material is exposed to elevated temperatures sufficient to cause the intumescent material to expand. Since the expansion is uncontrolled, particularly with regard to the direction of expansion it is not always assured that the cross-sectional flow areas between two neighboring slats are completely sealed off. Thus, some air could still pass through the louvers.

German Patent Publication DE 36 12 377 A1 discloses a fire protection sealing tape in which a tape material is combined with one or more intumescent fire protection strands. The intumescent strands which expand their volume in response to a respective expansion temperature, are combined with the tape material in such a way, that the expansion of the intumescent material will expand the adhesive tape. These tapes have at least one adhesive outer surface. One or more intumescent material strands may be completely embedded in the tape material. Another conventional adhesive tape has a strand or strip of intumescent material positioned between two strips of tape material. The adhesive tape combined with an intumescent material strand or strands is installed in joints between neighboring sections of steel reinforced ceilings, walls, slots between lightweight construction walls, concrete ceilings and generally in gaps that must be closed. The main purpose of these conventional adhesive tapes is to prevent a fire that has started in one room from moving into neighboring rooms.

UK Patent Publication GB 2,277,871 A discloses a fire-resistant container in which a metal casing and its metal door are lined on the inside with layers of an intumescent adhesive, a heat resistant thermal insulating material, and an intumescent strip. The fire-resistant container is for example used to protect filing cabinets against a fire.

The above described conventional use of intumescent materials, particularly intumescent strips or strands or tapes, leaves room for improvement particularly for effectively using such materials in an aircraft.

OBJECTS OF THE INVENTION

In view of the above it is the aim of the invention to achieve the following objects singly or in combination:
- to provide a method that permits simultaneously an early smoke detection and a fire smothering or even extinguishing the fire, in an enclosed space inside the body of an aircraft;
- to automatically seal an enclosed space in an aircraft in response to the occurrence of a temperature that will cause an intumescent material to expand inside the enclosed space; and
- to at least initially guide the expansion direction of the intumescent material to substantially or completely seal the enclosed space in an aircraft, to significantly reduce or even prevent the entrance of air in the enclosed space in which a fire has started.

SUMMARY OF THE INVENTION

A method for detecting smoke and smothering a fire in an enclosed space inside an aircraft is characterized according to the invention by the following steps:
a) providing at least one air flow passage for air to flow into and out of said enclosed space for letting smoke, generated by a beginning fire, out of said enclosed space for visual detection of the smoke outside said enclosed space,
b) installing in said enclosed space a fireproof or fire intumescent material next to and along said at least one air flow passage, said fireproof or fire-resistant intumescent material having an expansion temperature response characteristic higher than a smoke causing temperature in said enclosed space, and
c) heating said fireproof or fire-resistant intumescent material at least to said expansion temperature for expanding said fireproof or fire-resistant intumescent material into said at least one air flow passage for substantially sealing said at least one air flow passage thereby substantially stopping air and oxygen access to said enclosed space to smother said fire.

The terms "fireproof" and "fire resistant" are used synonymously. The term "substantially" means that air access has been reduced sufficiently to smother the fire even though air flow has not been closed off completely.

According to the invention there is further provided an aircraft having a body enclosing a first space in which there is a second enclosed space such as an overhead luggage compartment or a container for goods such as foods or freight. The enclosed second space has an opening and a lid or door to cover the opening. At least one flow passage or gap or leak is provided for permitting smoke to pass out of the enclosed second space when a beginning fire generates smoke inside the enclosed second space for an early visual smoke detection and thus of a beginning fire. According to the invention a fireproof intumescent material is positioned inside of the enclosed second space along the flow passage gap or leak so that the flow passage, gap or leak remains temporarily unobstructed when a fire has started for smoke to escape and thus to be detected. The fireproof intumescent material does not yet expand at temperatures at which smoke is generated, but it does expand when the fire is generating a temperature corresponding to or exceeding the response temperature of the fireproof intumescent material, whereby the expanding fireproof material enters into the air flow passage leak or slot for substantially airtightly sealing any air flow passage or air flow passages and thus preventing air and oxygen from entering into the enclosed space for smothering the fire.

According to the invention the fireproof or fire-resistant intumescent material is so positioned that at least its initial expansion is controlled or rather directed, for example by a guide surface into the air flow passage, gap or leak so that these openings are substantially completely filled and thus sealed with the intumescent material. When the intumescent material is installed in a groove extending alongside the openings the lateral groove walls act as a guide surface at least at the beginning of the expansion, particularly when the groove is not completely filled with intumescent material.

BRIEF DESCRIPTION OF THE DRAWINGS

In order that the invention may be clearly understood, it will now be described in connection with example embodiments and with reference to the accompanying drawings, wherein.

DETAILED DESCRIPTION OF A PREFERRED EXAMPLE EMBODIMENT AND OF THE BEST MODE OF THE INVENTION

Figure 1:
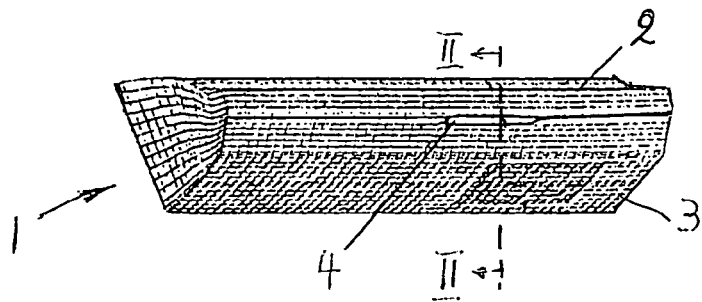
FIG. 1 is a perspective view of a passenger aircraft overhead luggage compartment with an air gap for initial smoke escape according to the invention.

FIG. 1 shows an overhead luggage compartment 1 with a lid 2 and a wall 3 forming a compartment box or bin. According to the invention a defined slot or gap 4 is provided in the wall 3 of the compartment 1. Preferably, the slot or gap 4 is intentionally provided along preferably a short portion of a bottom edge where the lid 2 in its closed state does not contact the bottom edge of the bin to permit smoke to escape through the slot or gap 4.

The slot or gap 4 assures that smoke generated by a beginning fire in the compartment 1 can be visually detected as the smoke exits through the slot or gap 4.

Figure 2:
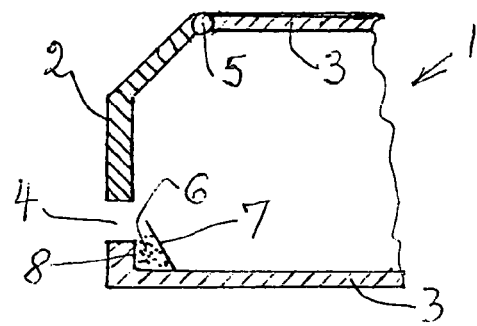
FIG. 2 is a schematic sectional view along section line II-II in FIG. 1.

FIG. 2 shows that a hinge 5 secures the lid 2 to the compartment wall 3 of the compartment 1. The lid 2 is shown in a closed condition to illustrate the position of the gap 4. According to the invention intumescent fireproof or fire resistant material 6, for example in the form of an adhesive strip, is positioned inside the enclosed space of the compartment 1 alongside and in parallel to the gap 4 and along any other leak that may exist. The intumescent material 6 may be adhesively bonded to an inwardly facing edge 8 of the compartment wall 3. A guide surface 7 such as a sheet metal strip or the like makes sure that expansion of the intumescent material 6 is directed, at least when the expansion begins, from an exposed area of the intumescent material 6 that is not covered or confined by the guide surface 7 and that faces toward the defined gap 4, into the gap 4 to substantially completely seal the gap 4 if the temperature inside the compartment 1 has risen above an expansion response temperature of the intumescent material 6.

Figure 3:
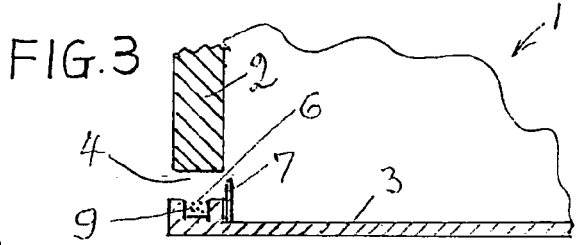
FIG. 3 is a view similar to FIG. 2 showing an installation of the intumescent material in a groove extending alongside of the airflow gap.

FIG. 3 is a view similar to that of FIG. 2, however the intumescent material 6 is installed in a groove 9 of the compartment wall 3 next to the gap 4. The guide surface 7 again makes sure that the intumescent material expands into the gap from an exposed area of the intumescent material 6 that is not covered or confined by the guide surface 7 and the groove 9. In both instances, namely FIG. 2 and FIG. 3, the gap 4 prior to the expansion of the intumescent material 6, remains open so that smoke can escape and thereby be seen outside of the compartment 1. In FIG. 3, the guide surface 7 may not be necessary if the groove 9 is not completely filled with intumescent material 6. In that case the side walls will guide the expanding material into the gap 4 at least initially when the expansion begins.

Figure 4:
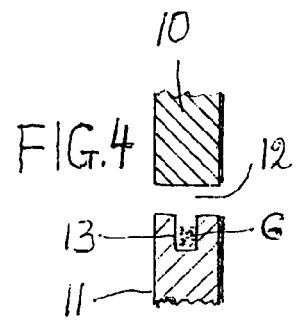
FIG. 4 is a sectional view through two abutting container wall sections.
Figure 5:
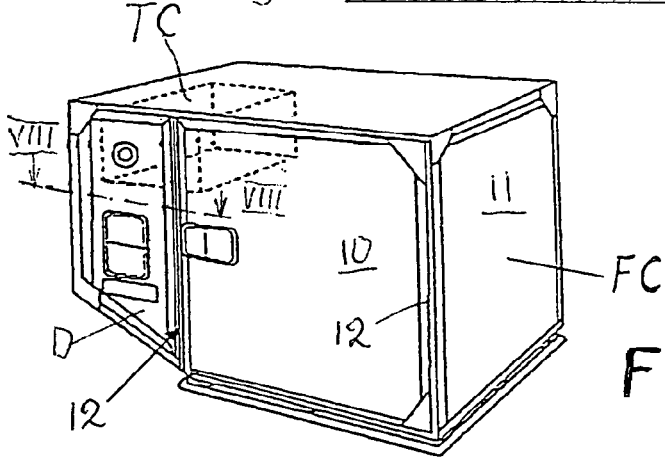
FIG. 5 shows a perspective view of a food container for an aircraft equipped according to the invention with intumescent material or strips.
Figure 6:
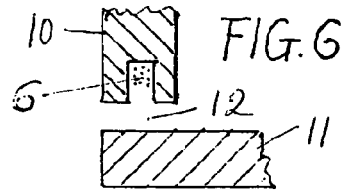
FIG. 6 is a sectional view of two container walls forming a corner.
Figure 7:
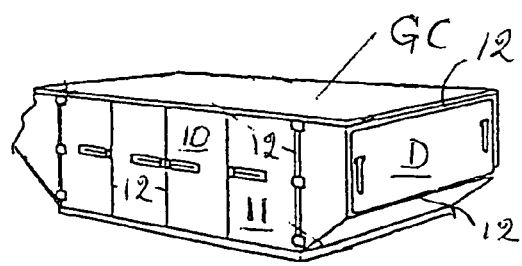
FIG. 7 shows a perspective view of a freight container to illustrate where air leaks can occur.

The same consideration applies to the installation of the intumescent material in a food container FC shown in FIG. 5 or a goods container GC shown in FIG. 7. In all instances the intumescent material is installed in parallel to and alongside any defined gaps and leaks forming air flow or rather smoke flow passages 12 in the containers FC and GC. Such air flow or smoke flow passages 12 may be positioned in the food container FC around the door D and where container wall sections 10, 11 are joined to each other. The smoke or air flow passage 12 is shown exaggerated in FIGS. 4 and 6. FIG. 5 also shows in dashed lines a trash container TC.

In FIG. 4 two walls 10 and 11 abut each other, but still provide an air flow passage 12 along the wall edges that are joined to each other so that smoke can pass though the air flow passage. According to the invention a groove 13 is provided in at least one of the two abutting walls 10 and 11 and the groove is filled with intumescent material 6, preferably not completely so that the side surfaces of the groove 13 facing each other can function at least initially for directing the expansion of the intumescent material 6 when the required expansion temperature has been generated by a fire in the container FC or GC. Similar considerations apply to FIG. 6, except that the walls 10 and 11 form a corner with an air flow passage 12 which permits smoke to leak through the passage 12 prior to the expansion of the intumescent material 6.

Figure 8:
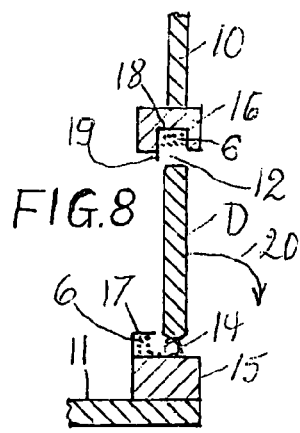
FIG. 8 is a sectional view along section line VIII-VIII in FIG. 5.

FIG. 8 shows the sectional view along the section plane VIII-VIII in FIG. 5. A hinge 14 secures the door D to a door frame section 15. Intumescent material 6 is installed, for example in the form of an adhesive strip along the door frame section 15 next to and along the hinge 14. A guide surface 17 assures that the intumescent material 6 will expand in the direction toward any leaks that are formed along the hinge 14 to seal this area, preferably completely. A groove 18 is provided in a further frame section 16. Intumescent material 6 is inserted into the groove 18. Again a guide surface 19 makes sure that the initial expansion of the intumescent material 6 is guided or directed into the gap or leak 12. The door opens outwardly as indicated by the arrow 20. The guide surface 19 may not be necessary if the groove 18 is only partly filled as explained above.

An important advantage of the invention is seen in that following the early discovery of smoke that can escape through the gap 4 or the leaks 12 forming air flow passages, the intumescent material 6 can expand into the air flow passage as soon as the required heat has been generated by a fire in the enclosed space inside an aircraft. As soon as these air flow passages are sealed by the intumescent material 6, air flow and hence oxygen supply into the enclosed space is stopped or at least reduced to a substantial extent so that the fire will be smothered and possibly completely extinguished. This feature of the invention greatly facilitates firefighting operations onboard of an aircraft, particularly since a fire that has started in an enclosed space such as a luggage compartment or goods container can extinguish itself automatically without any further efforts by the crew. These self-extinguishing characteristics of the invention are cost effective and hardly add any weight to the total weight of the aircraft.

The intumescent material is preferably "PALUSOL" (™) manufactured by BASF AG in Germany.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for detecting smoke in an aircraft and smothering a fire in an enclosed space in said aircraft, wherein said aircraft includes a defined gap (4) forming an air and smoke flow passage (12) that communicates into said enclosed space, and said aircraft further includes a fire resistant intumescent material installed alongside said defined gap, said method comprising the following steps:
   a) selecting said fire resistant intumescent material to have a temperature responsive expansion characteristic which prevents an expansion of said fire resistant intumescent material to close said defined gap in response to a first temperature that is sufficient to generate smoke and insufficient to generate a fire in said enclosed space, and which permits expansion of said fire resistant intumescent material in response to a second temperature higher than said first temperature and sufficient to generate a fire in said enclosed space,
   b) exposing said fire resistant intumescent material to said first temperature while smoke is generated in said enclosed space, whereby said fire resistant intumescent material does not expand so as to close said defined gap, such that said defined gap remains open and permits said smoke to escape out of said enclosed space through said defined gap to enable said detecting of said smoke outside of said enclosed space, and
   c) exposing said fire resistant intumescent material to said second temperature while said fire is generated in said enclosed space, whereby said fire resistant intumescent material undergoes expansion, and further guiding said fire resistant intumescent material during the expansion thereof with a guide surface to fill said defined gap thereby substantially sealing said defined gap to reduce or stop an air supply to said fire in said enclosed space so as to smother said fire,
   wherein said guide surface leaves an exposed area of said intumescent material uncovered and unconfined, and said exposed area of said intumescent material faces toward said defined gap, whereby said intumescent material during said expansion will be guided by said guide surface to expand outwardly from said exposed area toward and into said defined gap.

2. The method of claim 1, further comprising providing said fire resistant intumescent material as an adhesive tape having a sticky surface and sticking said adhesive tape to an inner surface of said enclosed space alongside said defined gap.

3. The method of claim 1, wherein said intumescent material is installed in a groove of a housing structure alongside said defined gap, and at least one wall of said groove forms a guide surface that performs said guiding of said expanding intumescent material outwardly from said exposed area away from said groove and toward and into said defined gap so as to fill said defined gap.

4. An aircraft comprising a body enclosing a first space, a housing enclosing a second space inside said first space, an opening in said housing, a closure for closing said opening of said housing, a defined gap (4) communicating between said first space and said second space even when said closure closes said opening, and a fire resistant intumescent material installed alongside said defined gap, said fire resistant intumescent material having a temperature responsive expansion characteristic such that said fire resistant intumescent material does not expand to close said defined gap in response to a first temperature that is sufficient to generate smoke and insufficient to generate a fire in said second space whereby said defined gap (4) first remains open to permit smoke generated in said second space to escape from said second space to said first space through said defined gap (4) to enable detection of said smoke in said first space, said temperature responsive expansion characteristic of said fire resistant intumescent material providing expansion of said fire resistant intumescent material in response to a second temperature that is higher than said first temperature and that is sufficient to generate a fire in said second space whereby expanding fire resistant intumescent material fills and substantially seals said defined gap (4) so as to prevent or inhibit air from entering said second space thereby to smother a fire in said second space inside said aircraft, said aircraft further comprising a guide surface positioned alongside said defined gap (4) and adapted to guide said expanding fire resistant intumescent material into said defined gap (4), wherein said guide surface leaves an exposed area of said intumescent material uncovered and unconfined, and said exposed area of said intumescent material faces toward said defined gap, whereby said intumescent material during said expansion will be guided by said guide surface to expand outwardly from said exposed area toward and into said defined gap.

5. The aircraft of claim 4, wherein said housing is an overhead luggage bin and said closure is a bin lid, and wherein said defined gap (4) is positioned between said bin lid in a closed position and an edge of said opening in said housing forming said overhead luggage bin.

6. The aircraft of claim 4, wherein said housing is a goods container.

7. The aircraft of claim 4, wherein said fire resistant intumescent material is an adhesive tape secured to said housing alongside said defined gap inside said housing.

8. The aircraft of claim 4, wherein said intumescent material is installed in a groove in said housing alongside said defined gap, and at least one wall of said groove forms said guide surface that is positioned and adapted to guide said expanding intumescent material to expand outwardly from said exposed area away from said groove into said defined gap.

9. An aircraft comprising a body enclosing a first space, a housing enclosing a second space inside said first space, an opening in said housing, a closure for closing said opening of said housing, a defined gap (4) into said housing, and a fire resistant intumescent material installed alongside said defined gap inside said housing, said fire resistant intumescent material having a temperature responsive expansion characteristic such that first an expansion of said fire resistant intumescent material is prevented in response to a first temperature that is sufficient to generate smoke in said second space and insufficient to expand said fire resistant intumescent material whereby said defined gap (4) first remains open to permit smoke generated in said second space to escape from said second space through said defined gap (4) for detecting said smoke, said temperature responsive expansion characteristic of said fire resistant intumescent material permitting expansion of said fire resistant intumescent material in response to a second temperature higher than said first temperature, said second temperature being sufficient for generating a fire in said second space and for expanding said fire resistant intumescent material, whereby expanding fire resistant intumescent material fills and substantially seals said defined gap (4) for preventing air and oxygen from entering said second space to smother a fire in said second space inside said aircraft, further comprising a groove alongside said defined gap in said housing, said fire resistant intumescent material being installed in said groove, and wherein at least one wall of said groove is a guide surface for guiding said expanding fire resistant intumescent material in a desired direction into said defined gap.

10. The aircraft of claim 9, wherein said fire resistant intumescent material in an unexpanded state thereof partially fills said groove so that groove walls of said groove form guide surfaces for guiding said expanding fire resistant intumescent material.

11. An aircraft comprising:
an aircraft body enclosing a first space;
an enclosure housing that encloses a second space within said first space, and that has a defined gap in said enclosure housing forming an airflow communication passage between said first space and said second space;
a guide structure that is arranged alongside said defined gap on said enclosure housing; and
an intumescent material that is arranged along said guide structure alongside said defined gap, and that is arranged and adapted to undergo a heat-induced expansion into said defined gap so as to close said airflow communication passage at an elevated temperature associated with generation of fire by combustion in said second space;
wherein said guide structure leaves uncovered and unconfined an exposed area of said intumescent material facing toward said defined gap, and said guide structure is configured and arranged so as to guide said intumescent material during the expansion thereof so that said intumescent material expands outwardly from said exposed area toward and into said defined gap so as to close said airflow communication passage.

12. The aircraft according to claim 11, wherein said intumescent material has a temperature responsive expansion characteristic such that said intumescent material does not expand so as to close said airflow communication passage at an intermediate temperature that is lower than said elevated temperature and is associated with generation of smoke but no generation of fire at a beginning of the combustion in said second space.

13. The aircraft according to claim 11, wherein said guide structure comprises a groove or a channel alongside said defined gap on said enclosure housing, said intumescent material is arranged in said groove or said channel, an open side of said groove or said channel facing toward said defined gap leaves said exposed area of said intumescent material uncovered and unconfined, and at least one sidewall of said groove or said channel is a guide surface arranged so as to guide said intumescent material during the expansion thereof outwardly from said exposed area toward and into said defined gap.

14. The aircraft according to claim 11, wherein said guide Structure comprises a guide strip element that is attached to said enclosure housing alongside said defined gap and that provides a guide surface positioned to deflect and guide said intumescent material during the expansion thereof outwardly from said exposed area toward and into said defined gap.

\* \* \* \* \*